United States Patent [19]
Demeter

[11] 3,916,377
[45] Oct. 28, 1975

[54] VEHICLE SAFETY WARNING DEVICE
[75] Inventor: John C. Demeter, Fenton, Mich.
[73] Assignee: Cycle Sentry Leasing, Fenton, Mich.
[22] Filed: July 29, 1974
[21] Appl. No.: 492,618

[52] U.S. Cl. .................. 340/65; 340/72; 340/93; 340/134
[51] Int. Cl.² .................. B60Q 1/26; B60R 25/10
[58] Field of Search ............ 340/65, 66, 71, 72, 87, 340/88, 93, 99, 134; 240/8.3, 90

[56] References Cited
UNITED STATES PATENTS

| | | | |
|---|---|---|---|
| 3,631,390 | 12/1971 | Murphy | 340/263 X |
| 3,641,491 | 2/1972 | Bath | 340/61 |
| 3,696,334 | 10/1972 | Demeter | 340/87 X |
| 3,728,675 | 4/1973 | Horn | 340/65 |

*Primary Examiner*—Alvin H. Waring
*Attorney, Agent, or Firm*—Barnes, Kisselle, Raisch & Choate

[57] ABSTRACT

A vehicle warning device for mounting on a two or three wheeled vehicle to alert drivers of automobiles or trucks of the presence of the two or three wheeled vehicle comprising a housing which supports a pole having a strobe light at the upper end thereof that is energized to emit brilliant flashes periodically when the road lamps of the vehicle are energized. The housing further includes an alarm system that can be selectively energized when the vehicle is parked to actuate an alarm if the vehicle is jarred or moved.

24 Claims, 10 Drawing Figures

VEHICLE SAFETY WARNING DEVICE

This invention relates to vehicle warning devices.

BACKGROUND OF THE INVENTION

One of the major problems with the use of small vehicles such as motorcycles on the road is the difficulty that truck and automobile drivers have in recognizing the presence of such a vehicle either on the highway or in traffic both in daytime and nighttime.

In my prior U.S. Pat. No. 3,696,334 issued Oct. 3, 1972, I have disclosed the concept of providing a lamp on the upper end of a pole to provide a light above the head of the driver of the motorcycle. Such a device is effective but still has the difficulty that it might be misconstrued by the driver of an automobile or truck as being merely a light from a sign or other large vehicle.

Accordingly among the objects of the invention are to provide a vehicle warning device which will effectively register upon the driver of an automobile or truck that a motorcycle is present; which will do so without affecting the normal vision of the driver; which will give 360° of protection to the driver of the motorcycle under all driving conditions; which will provide a warning to the driver of an automobile or truck even though the motorcycle is hidden in congested traffic conditions; which is energized when the road lamps of the motorcycle are energized; which can be controlled so that only one device is energized where a plurality of motorcycles are moving together and which is effectively and easily mounted on the vehicle.

Another problem in connection with ownership of small vehicles such as motorcycles is the matter of theft. Alarms have heretofore been provided. However in accordance with the invention, an alarm system is incorporated in the warning device as a part of a package that can be adapted to the vehicle easily and effectively and which will provide a warning when the vehicle is jarred or moved when the alarm is set.

SUMMARY OF THE INVENTION

In accordance with the invention, the vehicle warning device for mounting on a wheeled vehicle comprises a housing which supports a pole having a strobe light at the upper end thereof that is energized to emit brilliant flashes periodically when the road lamps of the vehicle are energized. The housing further includes an alarm system that can be selectively energized when the vehicle is parked to actuate an alarm if the vehicle is jarred or moved.

DESCRIPTION

Figure 1:
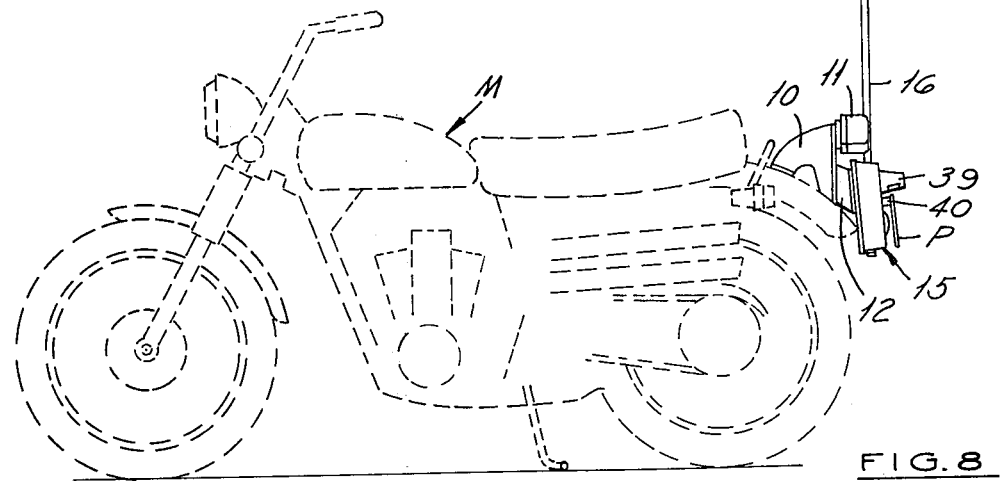
FIG. 1 is a side elevational view of a motorcycle embodying the invention.

Referring to FIG. 1, the invention is described in connection with a small wheeled vehicle such as a motorcycle M that conventionally includes a taillight mounting bracket 10 on which a taillight 11 is mounted to illuminate a license plate mounted on a license plate bracket 12 forming a part of the bracket 10.

In accordance with the invention, the vehicle warning device includes a housing 15 that supports a telescopic pole 16 on which a strobe lamp 17 is mounted. The housing 15 further includes a theft alarm, as presently described.

Figure 9:
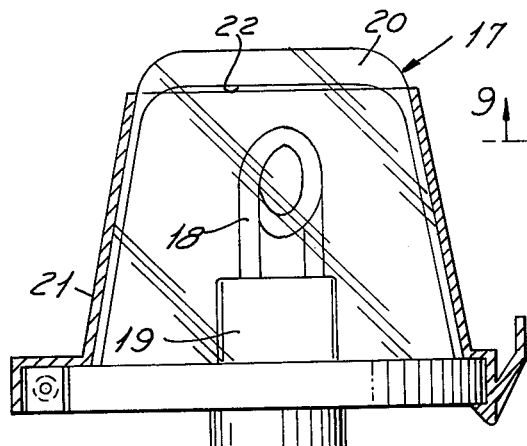
FIG. 9 is a sectional view taken along the line 9—9 in FIG. 8.
Figure 8:
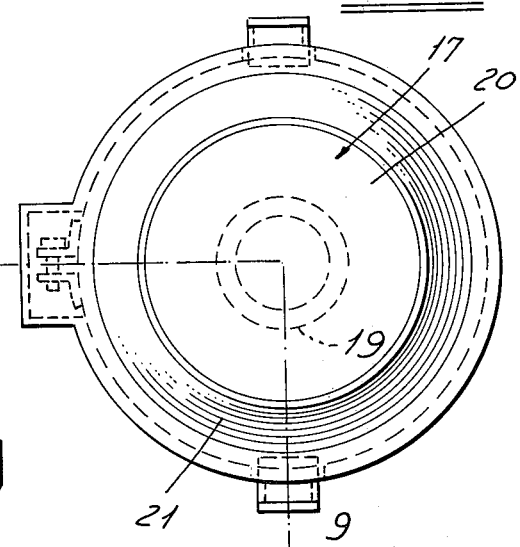
FIG. 8 is a plan view of a portion of the device.
Figure 10:
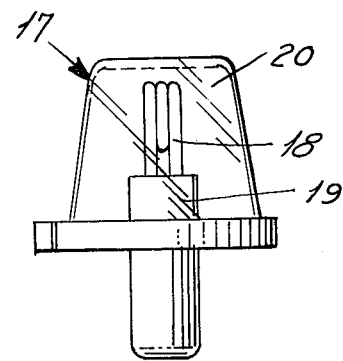
FIG. 10 is a view similar to FIG. 9 with a part removed.

As shown in FIG. 9, the strobe lamp 17 includes a strobe emitting device 18 mounted in a socket 19 and a lens 20 thereover which is preferably clear uncolored plastic. When energized, the strobe light emits brilliant flashes periodically on the order of 1 per second that provides an instant register upon the mind of a driver of an automobile or truck in 360° with respect to the motorcycle M. The strobe lamp when energized instantly draws the attention of the driver of the automobile or truck to its presence at a distance far enough removed to give the driver ample time to become alert and move with caution thereby avoiding any confrontation between the automobile or truck and the motorcycle. As a result, such accidents which are usually fatal to the cyclist can be minimized. The brilliant flashes of light cannot be confused with other lights such as signs and the like and provide adequate warning not only on the highway but under congested traffic conditions where the motorcycle itself cannot be seen.

The brilliant light can also be used at night and with persons of normal vision will not be objectionable since the strobe light flashes on and off at such a rapid pace that the eye immediately registers the light but the intensity does not affect the eye because of the splitsecond emission of light. However since persons often drive with eye defects, I have found that a cover should preferably be provided over the strobe lamp to restrict the horizontal emission of light at night. Thus as shown in FIG. 9, the cover 21 is frusto conical and overlies the lens 20 except for the upper wall 22 so that the major portion of the light is emitted vertically with a small percentage horizontally. The resultant effect is to produce a beam of light that flashes upwardly and can be seen a long distance away.

For example utilizing a strobe lamp that operates on 400 volts of energy with one flash per second, the beam can be seen at least one quarter mile away.

Figure 2:
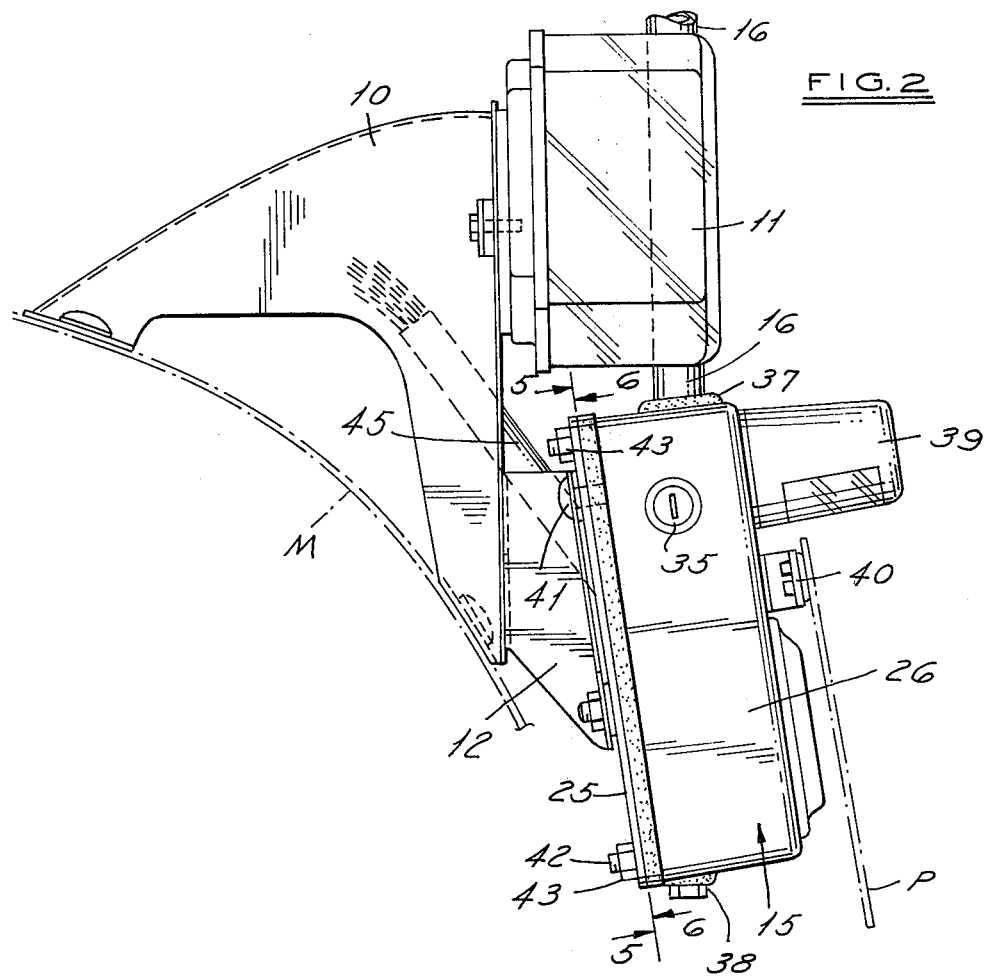
FIG. 2 is a side elevational view on an enlarged scale.
Figure 3:
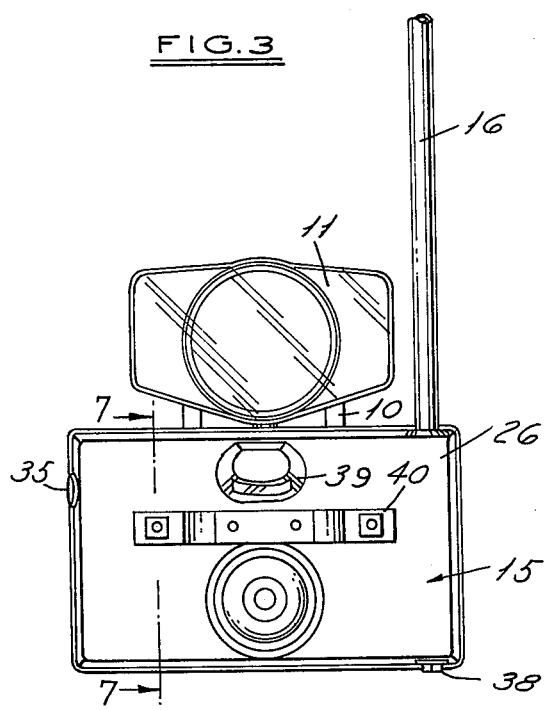
FIG. 3 is a front elevational view.
Figure 4:
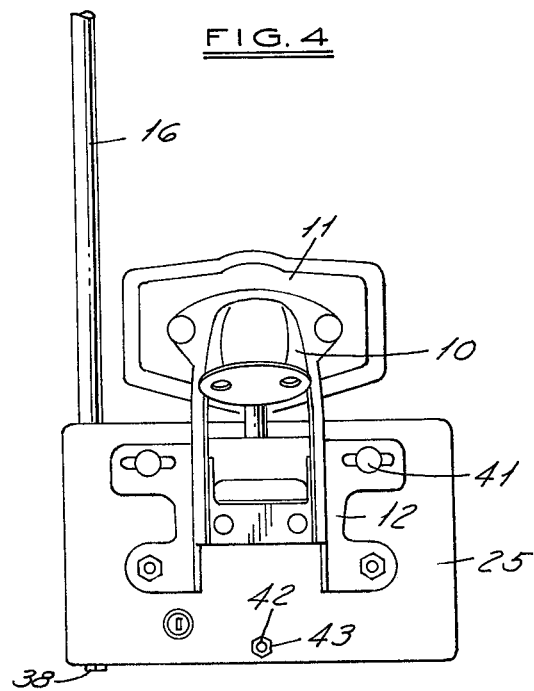
FIG. 4 is a rear elevational view.
Figure 5:
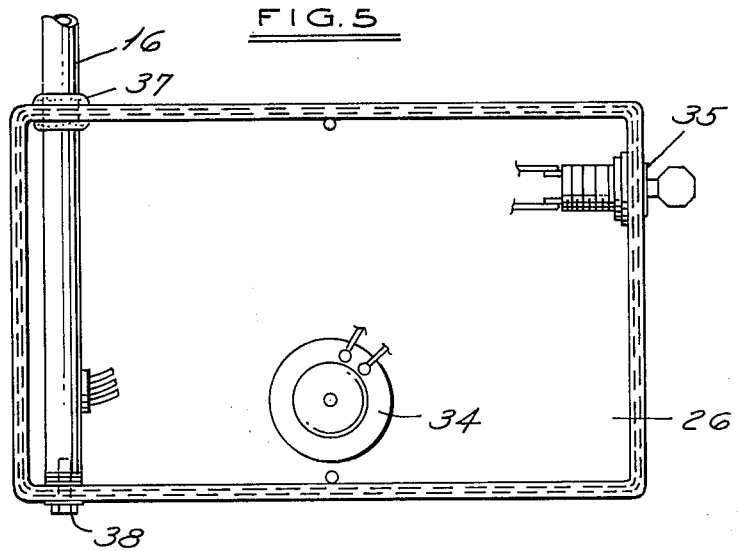
FIG. 5 is a sectional view taken along the line 5—5 in FIG. 2.
Figure 6:
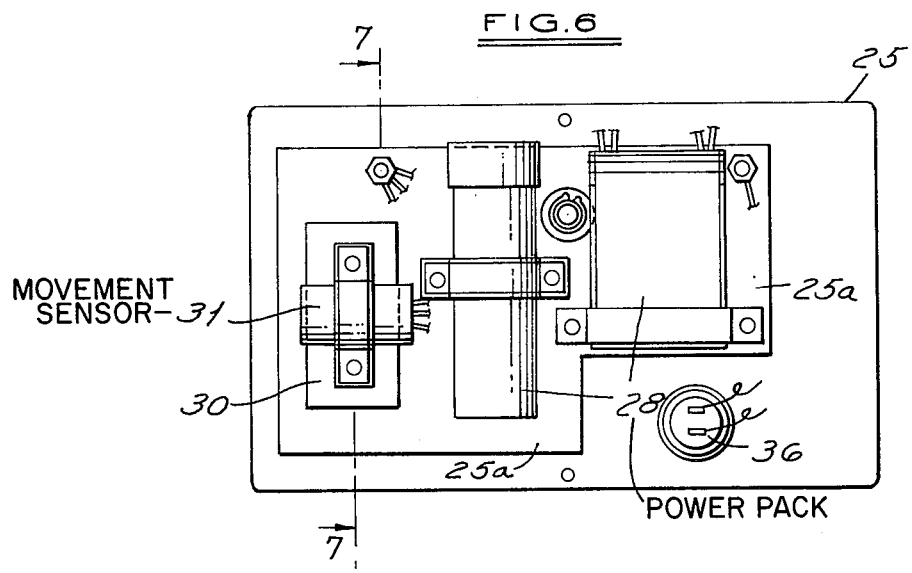
FIG. 6 is a sectional view taken along the line 6—6 in FIG. 2.
Figure 7:
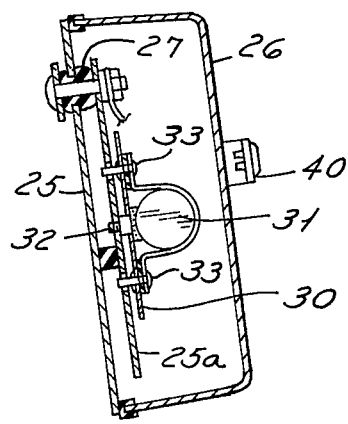
FIG. 7 is a sectional view taken along the line 7—7 in FIG. 6.

Referring to FIG. 2, it can be seen that the housing 15 comprises two pieces including a plate 25 and a complementary portion 25a defining the enclosure. The first part 25 of the housing supports a plate 26 in spaced relationship thereto by grommets 27. The plate 26 in turn supports the two portions of the power pack 28 for the strobe lamp and an additional plate 30 for a movement sensor 31 such as a mercury switch. The plate 30 is initially rotatably mounted by a screw 32 and when mounted on the vehicle, as presently described, the plate is rotated so that the sensor 31 does not produce any alarm and then rivets 33 are provided to lock the plate in this adjusted position. The housing part 26 further supports a horn 34 that is electrically connected to the sensor 31 and is energized when the motorcycle is moved. A key operated switch 35 is provided to set the alarm. A second key operated switch 36 is provided to inactivate the strobe light even though the lamp of the vehicle is energized. Such a control might be desired where a plurality of motorcycles are moving along the highway and only one strobe lamp need be energized to provide a warning. Alternatively, an on-off switch can be used in place of the key operated switch 36.

The pole 16 is supported by the second housing part 26 by a construction which includes passage of the pole through an upper grommet 37 and fastening to the lower end of the housing by a screw and nut arrangement 38.

The second housing part 26 further includes a lamp 39 illuminating a license plate P mounted on a bracket 40 on the outer surface of the housing part 26.

In order to mount the alarm device, the first housing part 25 is first mounted on the conventional license plate bracket 12 with at least two bolts 41 that have smooth heads so that they cannot be loosened from the exterior. The second housing part can then be placed in position and held by bolts 41, 42 and nuts 43. Although these nuts 43 may be accessible when the alarm is activated, any movement due to an attempt to loosen them would actuate the alarm and energize the horn.

The electrical connections for both the strobe lamp and the theft alarm extend through a wire reinforced cable 45 upwardly into the interior of the conventional bracket 10 and thereafter in accordance with conventional practice under the seat of the motorcycle to the battery and the switches of the vehicle. Any attempt to cut the cable 45 when the alarm is activated will jar the vehicle and energize the horn.

The electrical connections between components on housing part 25 and housing part 26 are preferably made by disconnectable plugs and sockets. The electrical wires through telescopic pole 16 is preferably coiled.

The electrical connection from the strobe light is to the light switch of the vehicle to the battery. The electrical connection of the alarm is directly to the battery.

It has been found that the warning device embodying the invention effectively warns oncoming motorists of the presence of the motorcycle and thereby alerts them to proceed with care. The alarm system when energized is provided in a tamper-proof housing so that any tampering or attempted movement of the vehicle will energize the horn.

Although the device has been described as a combined warning light and alarm, alternatively the alarm can be omitted. In addition, although the preferred mounting is on the license plate bracket, it can also be mounted on other parts of the vehicle. In addition, the device has utility on vehicles such as a snowmobile in which case the lens 20 can be covered with a transparent red cap similar in shape to cap 21. In the latter case, the light would serve as a distress signal in case of breakdown or accident.

I claim:

1. In a motorcycle having a low profile, the combination comprising
    a pole,
    means for supporting said pole such that it extends generally vertically on the motorcycle,
    said pole having its upper end extending above said motorcycle,
    a strobe lamp having a clear lens having a side wall through which light may be emitted horizontally mounted on said pole,
    a power pack mounted on said motorcycle and connected to said strobe lamp such that upon energization of the power pack, the strobe lamp functions to periodically provide brilliant flashes of light.

2. The combination set forth in claim 1 including means associated with said lens and selectively operable to prevent the major portion of the light from extending horizontally.

3. The combination set forth in claim 2 wherein said last-mentioned means comprises a removable opaque cover mounted on said lens for excluding the major portion of the horizontal components of light through said wall of said lens and thereby substantially preventing said horizontal components from passing outwardly through said side wall.

4. The combination set forth in claim 3 wherein said lens includes a transparent top wall,
    said cover substantially covering said side wall and leaving said top wall substantially uncovered.

5. The combination set forth in claim 1 including a housing,
    means for supporting said housing on the license bracket of said motorcycle,
    said housing enclosing said power pack.

6. The combination set forth in claim 5 wherein said housing comprises said means for supporting said pole.

7. The combination set forth in claim 5 including a movement sensitive alarm resiliently mounted in said housing.

8. The combination set forth in claim 7 including switch means on said housing for activating and inactivating said alarm.

9. The combination set forth in claim 5 including switch means on said housing for activating and inactivating said strobe lamp.

10. The combination set forth in claim 5 including electrical leads connected to said power pack and extending to the electrical system of the motorcycle such that when the road lamps of the motorcycle are energized, said strobe lamp is energized.

11. In a motorcycle, the combination comprising
    a pole,
    a strobe lamp having a clear uncolored lens having a side wall through which light may be emitted horizontally mounted on said pole,
    a housing mounted on said motorcycle,
    said pole having its upper end extending above said motorcycle,
    a power pack mounted in said housing and connected to said strobe lamp such that upon energization of the power pack, the strobe lamp functions to periodically provide brilliant flashes of light,
    a movement sensitive alarm resiliently mounted in said housing.

12. The combination set forth in claim 11 including means associated with said lens and selectively operable to prevent the major portion of the light from extending horizontally.

13. The combination set forth in claim 12 wherein said last-mentioned means comprises a removable opaque cover mounted on said lens for excluding the major portion of the horizontal components of light through said wall of said lens and thereby substantially preventing said horizontal components from passing outwardly through said side wall.

14. The combination set forth in claim 13 wherein said lens includes a transparent top wall,
said cover substantially covering said side wall and leaving said top wall substantially uncovered.

15. The combination set forth in claim 11 including switch means on said housing for activating and inactivating said alarm.

16. The combination set forth in claim 11 including switch means on said housing for activating and inactivating said strobe lamp.

17. The combination set forth in claim 11 including electrical leads connected to said power pack and extending to the electrical system of the motorcycle such that when the road lamps of the motorcycle are energized, said strobe lamp is energized.

18. For use in a motorcycle having a license plate bracket, a two-part housing including a first part adapted to be mounted on the license plate bracket of the motorcycle,
a second part cooperating with the first part to provide an enclosure,
a mounting plate mounted on said first part,
means for resiliently mounting said plate on said first part,
a strobe power pack mounted on said plate,
a pole mounted on one of said housing parts such that when said housing is mounted on said license plate bracket, the upper end of said pole extends above said motorcycle,
a strobe lamp having a clear uncolored lens having a side wall through which light may be emitted horizontally mounted on the upper end of said pole and electrically connected to said power pack,
a movement sensor mounted on said plate,
and an alarm device electrically connected to said movement sensor and mounted on one of said housing parts,
electrical leads extending from the interior of said housing to the exterior,
a reinforced cable surrounding said leads.

19. The combination set forth in claim 18 including means associated with said lens and selectively operable to prevent the major portion of the light from extending horizontally.

20. The combination set forth in claim 19 wherein said last-mentioned means comprises a removable opaque cover mounted on said lens for excluding the major portion of the horizontal components of light through said wall of said lens and thereby substantially preventing said horizontal components from passing outwardly through said side wall.

21. The combination set forth in claim 20 wherein said lens includes a transparent top wall,
said cover substantially covering said side wall and leaving said top wall substantially uncovered.

22. The combination set forth in claim 18 including switch means on said housing for activating and deactivating the energization of the strobe lamp.

23. The combination set forth in claim 18 including lockable switch means on said housing for controlling said alarm.

24. The combination set forth in claim 18 including means for supporting said first part of said enclosure on said license plate bracket such that said means is inaccessible when said second part of said enclosure is positioned on said first part.

* * * * *